United States Patent
Aoyama et al.

(10) Patent No.: US 10,260,979 B2
(45) Date of Patent: Apr. 16, 2019

(54) PRESSURE DETECTION UNIT, PRESSURE SENSOR USING THE SAME, AND METHOD OF MANUFACTURING PRESSURE DETECTION UNIT

(71) Applicant: FUJIKOKI CORPORATION, Tokyo (JP)

(72) Inventors: Tomohisa Aoyama, Tokyo (JP); Motohisa Mukai, Tokyo (JP); Youko Tamura, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 143 days.

(21) Appl. No.: 15/429,504

(22) Filed: Feb. 10, 2017

(65) Prior Publication Data

US 2017/0234750 A1 Aug. 17, 2017

(30) Foreign Application Priority Data

Feb. 16, 2016 (JP) ................. 2016-026701

(51) Int. Cl.
*G01L 19/00* (2006.01)
*G01L 19/06* (2006.01)
(Continued)

(52) U.S. Cl.
CPC ........ *G01L 19/0069* (2013.01); *G01L 9/0042* (2013.01); *G01L 19/0645* (2013.01); *G01L 19/0672* (2013.01); *G01L 19/142* (2013.01)

(58) Field of Classification Search
CPC ..... G01L 19/147; G01L 9/0042; G01L 19/04; G01L 9/0072; G01L 13/025;
(Continued)

(56) References Cited

U.S. PATENT DOCUMENTS

2004/0200287 A1* 10/2004 Mueller ............. B29C 63/0065
73/715
2012/0055256 A1 3/2012 Drewes
(Continued)

FOREIGN PATENT DOCUMENTS

JP 2003287472 A 10/2003
JP 2004045216 A 2/2004
(Continued)

OTHER PUBLICATIONS

European Search Report corresponding to European Patent Application No. Ep 17 15 6181 dated Jun. 29, 2017.

*Primary Examiner* — Andre J Allen
(74) *Attorney, Agent, or Firm* — Bacon & Thomas, PLLC

(57) ABSTRACT

[Object] Provided are a pressure detection unit and a pressure sensor using the same capable of performing a trimming operation using a simple structure during an assembly operation, and reducing a decrease in detection accuracy of a semiconductor type pressure detection device.
[Solving Means] A pressure detection unit includes a base formed in a lid shape and made of ceramic, a receiving member formed in a plate shape, a diaphragm interposed between the base and the receiving member, a semiconductor type pressure detection device installed on a side of a pressure receiving space formed between the base and the diaphragm in the base, and three terminal pins electrically connected to the semiconductor type pressure detection device, the terminal pins penetrating the base, wherein the three terminal pins include an earth terminal pin, a power input terminal pin, and a signal output terminal pin.

11 Claims, 4 Drawing Sheets

(51) Int. Cl.
*G01L 9/00* (2006.01)
*G01L 19/14* (2006.01)

(58) Field of Classification Search
CPC . G01L 9/0054; G01L 9/0075; G01L 19/0038; G01L 19/0084; G01L 19/14; G01L 19/0069; G01L 19/0618; G01L 19/0645; G01L 9/0052; G01L 9/0055; G01L 9/0073; G01L 19/0092; G01L 19/143; G01L 9/0051; G01L 11/025; G01L 19/0046; G01L 19/06; G01L 19/0627; G01L 19/0681; G01L 9/00; G01L 9/0041; G01L 9/0044; G01L 11/04; G01L 19/007; G01L 19/0023; G01L 19/0672; G01L 19/069; G01L 19/142; G01L 19/16; G01L 27/002; G01L 7/00; G01L 7/163; G01L 7/166; G01L 9/0047; G01L 11/02; G01L 13/00; G01L 15/00; G01L 19/0609; G01L 19/083; G01L 19/148; G01L 7/08; G01L 9/0045; G01L 9/0048; G01L 9/006; G01L 9/007; G01L 9/0076; G01L 9/045; G01L 9/06; G01L 9/065; G01L 9/12; G01L 9/125; G01L 11/00; G01L 17/00; G01L 19/00; G01L 19/0015; G01L 19/003; G01L 19/0076; G01L 19/02; G01L 19/08; G01L 19/10; G01L 19/141; G01L 19/145; G01L 19/146; G01L 1/142; G01L 1/18; G01L 1/2262; G01L 1/2287; G01L 1/246; G01L 1/26; G01L 21/12; G01L 23/16; G01L 27/005; G01L 27/007; G01L 7/04; G01L 7/063; G01L 7/082; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/04; G01L 9/08; G01L 9/085; G01L 9/105; G01L 9/14; G01L 9/16
USPC .................................................. 73/700–756
See application file for complete search history.

(56) References Cited

U.S. PATENT DOCUMENTS

| 2016/0069765 | A1* | 3/2016 | Ishikawa | G01L 9/0051 73/431 |
| 2017/0234749 | A1* | 8/2017 | Aoyama | G01L 19/0069 73/706 |
| 2017/0234751 | A1* | 8/2017 | Aoyama | G01L 9/0042 73/706 |

FOREIGN PATENT DOCUMENTS

| JP | 2012068105 A | 4/2012 |
| WO | 2014122855 A1 | 8/2014 |

\* cited by examiner

PRESSURE DETECTION UNIT, PRESSURE SENSOR USING THE SAME, AND METHOD OF MANUFACTURING PRESSURE DETECTION UNIT

TECHNICAL FIELD

The present invention relates to a pressure sensor, and particularly relates to a liquid filling type pressure detection unit that accommodates a semiconductor type pressure detection device, and a pressure sensor using the same.

BACKGROUND ART

A liquid filling type pressure sensor in which a semiconductor type pressure detection device is accommodated inside a pressure receiving chamber partitioned by a diaphragm to be filled with oil has been used to detect a refrigerant pressure by being installed in a refrigerator-freezer or an air conditioner, or to detect a pressure of supplied oil by being installed in a fuel feeder of a vehicle.

The semiconductor type pressure detection device is disposed inside the pressure receiving chamber, and has a function of converting a pressure change inside a pressure receiving space into an electric signal and outputting the converted electric signal to the outside through a relay board or a lead wire.

Referring to such a pressure sensor, liquid such as water may enter the sensor from the outside to cause a defect in the semiconductor type pressure detection device depending on an environment in which the pressure sensor is installed or a usage condition of the device.

In this regard, there has been a known pressure sensor in which a cover is attached to a base accommodating a semiconductor type pressure detection device to fill the inside of the cover with an adhesive, thereby enhancing water tightness (see Patent Document 1).

CITATION LIST

Patent Document

Patent Document 1: JP 2012-68105 A

SUMMARY OF THE INVENTION

Problem to be Solved by the Invention

In the pressure sensor disclosed in Patent Document 1, normally, after the semiconductor type pressure detection device is attached to a central portion on an inner surface side of the base, the base, a diaphragm, and a receiving member are overlapped, subjected to girth welding, and integrated, thereby configuring a pressure detector.

In this instance, these members are formed using a metal material such as stainless steel, and thus the semiconductor type pressure detection device attached to the base detects distortion due to expansion or contraction in the base in a thermal history at the time of performing girth welding as a pressure change to be detected.

In addition, the semiconductor type pressure detection device detects a change in expansion or contraction of the base depending on a thermal environment in which the pressure sensor is used. Thus, for example, when a temperature difference in a usage environment is large, temperature correction (trimming) of the whole pressure sensor is required.

Further, such a trimming operation needs to be performed under a predetermined thermal environment after an assembly operation of the pressure detector or the whole pressure sensor, and a device for preparing the thermal environment, etc. is separately required.

Meanwhile, to perform the trimming operation after the assembly operation of the pressure detector or the pressure sensor, an adjustment terminal pin (lead pin) connected to the semiconductor type pressure detection device by penetrating the base needs to be provided in the pressure detector, and a process of providing the terminal pin, an additional material, etc. are required.

In addition, low-frequency electrical noise, so-called "common mode noise", from a device in which the pressure sensor is installed may be delivered from a piping system to which a fluid introduction pipe of the pressure sensor is connected. When the number of terminal pins is large, such noise is delivered to the semiconductor type pressure detection device through the pressure detector, and there is a concern that detection accuracy may decrease.

In this regard, an object of the invention is to provide a pressure detection unit and a pressure sensor using the same capable of performing a trimming operation using a simple structure during an assembly operation, and reducing a decrease in detection accuracy of a semiconductor type pressure detection device.

Means for Solving Problem

To achieve the above-mentioned object, a pressure detection unit according to the invention includes a base formed in a lid shape and made of ceramic, a receiving member formed in a plate shape, a diaphragm interposed between the base and the receiving member, a semiconductor type pressure detection device installed on a side of a pressure receiving space formed between the base and the diaphragm in the base, and three terminal pins electrically connected to the semiconductor type pressure detection device, the terminal pins penetrating the base, wherein the three terminal pins include an earth terminal pin, a power input terminal pin, and a signal output terminal pin.

In a pressure detection unit according to an embodiment of the invention, a first brazing portion is formed between the base and the three terminal pins. In this instance, a metallized layer may be further formed between the base and the first brazing portion.

In addition, the pressure detection unit further includes a caulking member that caulks and integrates the base and the receiving member from outer circumferential sides.

In the pressure detection unit according to an embodiment of the invention, a ring member is further interposed between the base and the diaphragm.

In this instance, a second brazing portion may be formed between the base and the ring member, and a metallized layer may be further formed between the base and the second brazing portion.

The pressure detection unit according to the invention may be used as a part of a pressure sensor including a cover attached to the pressure detection unit, and a lead wire having one end electrically connected to a terminal pin of the pressure detection unit and the other end protruding to an outside of the cover.

A method of manufacturing a pressure detection unit according to an embodiment of the invention includes a terminal pin attachment process of attaching three terminal pins to a base formed in a lid shape and made of ceramic, the three terminal pins penetrating the base, an electric connection process of installing a semiconductor type pressure detection device at a central portion of the base, and electrically connecting the three respective terminal pins to the semiconductor type pressure detection device, and an integration process of integrating a diaphragm with the base and a receiving member formed in a plate shape while the diaphragm is interposed between the base and the receiving member.

Effect of the Invention

According to a pressure detection unit and a pressure sensor using the same of the invention, it is possible to perform a trimming operation using a simple structure during an assembly operation, and reduce a decrease in detection accuracy of a semiconductor type pressure detection device due to common mode noise, etc.

In addition, the pressure detection unit and the pressure sensor using the same of the invention is less affected by expansion or contraction of a base due to a change in thermal environment, and thus may suppress a decrease in detection accuracy due to the change in thermal environment.

BRIEF DESCRIPTION OF DRAWINGS

FIGS. 1A and 1B depict a diagram illustrating an outline of a pressure detection unit according to Embodiment 1 of the invention, wherein FIG. 1A illustrates a top view of the pressure detection unit, and FIG. 1B illustrates a cross section taken along A-A line of FIG. 1A in side view;

FIGS. 3A and 3B depict a diagram illustrating an outline of a pressure detection unit according to Embodiment 2 of the invention, wherein FIG. 3A illustrates a top view of the pressure detection unit, and FIG. 3B illustrates a cross section taken along A-A line of FIG. 3A in side view.

MODE(S) FOR CARRYING OUT THE INVENTION

Embodiment 1

Figure 1A:
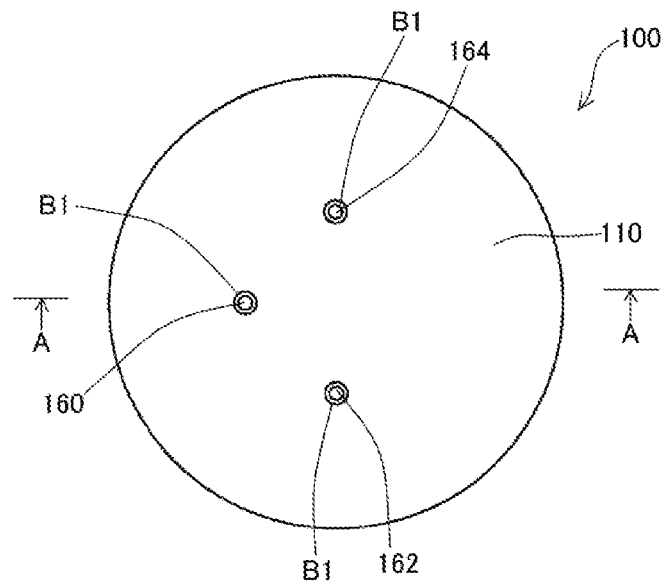
Figure 1B:
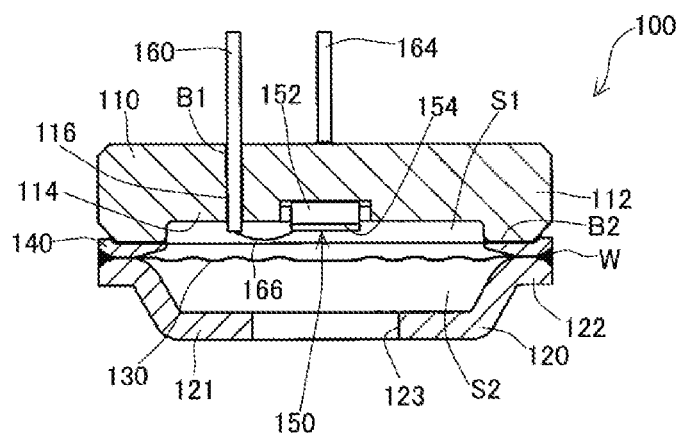

FIGS. 1A and 1B depict an outline of a pressure detection unit according to Embodiment 1 of the invention. FIG. 1A illustrates a top view of the pressure detection unit, and FIG. 1B illustrates a cross section taken along A-A line of FIG. 1A in side view.

As illustrated in FIGS. 1A and 1B, a pressure detection unit 100 according to Embodiment 1 of the invention includes a base 110 made of ceramic, a receiving member 120 facing the base 110, and a diaphragm 130 and a ring member 140 interposed between the base 110 and the receiving member 120.

The base 110 is a circular lid-shaped member in top view, and includes a ceramic material having an insulating property in which an outer circumferential portion 112 and an inner portion 114 having a smaller thickness than that of the outer circumferential portion 112 are integrated with each other as illustrated in FIG. 1B. That is, the base 110 has a shape in which a central portion thereof is recessed such that a pressure receiving space S1 described below is formed.

For example, a generally known material including an oxide such as alumina or zirconia, carbide such as silicon carbide, and a nitride such as silicon nitride may be used as the ceramic material included in the base 110.

The sealed pressure receiving space S1 is formed between the inner portion 114 of the base 110 and the diaphragm 130, and filled with a liquid medium having an insulating property such as oil.

In addition, a semiconductor type pressure detection device 150 described below is installed at a central portion on the pressure receiving space S1 side in the inner portion 114 of the base 110.

As illustrated in FIG. 1A, a plurality of through-holes (see reference numeral 116 of FIG. 1B) into which three terminal pins 160, 162, and 164 are inserted is formed at positions around the semiconductor type pressure detection device 150 in the base 110.

Further, the terminal pins 160, 162, and 164 penetrate the base 110 by being inserted into the plurality of through-holes 116, and one ends thereof are electrically connected to the semiconductor type pressure detection device 150.

For example, the receiving member 120 is formed using a metal material such as a stainless steel plate, is a plate-shaped member subjected to press molding such that a central portion is recessed, and includes a cylindrical portion 121 having a bottom and a cylindrical shape and a flange portion 122 formed at an upper end of the cylindrical portion 121 (the receiving member 120 may be formed by cutting, etc. other than press molding).

An opening 123 for installing a fluid inlet pipe (described below) is formed on a bottom surface of the cylindrical portion 121, and the diaphragm 130 is joined to an upper surface of the flange portion 122.

According to this configuration, a pressurization space S2 into which a fluid to be detected flows is formed between the receiving member 120 and the diaphragm 130.

For example, the diaphragm 130 is formed as a disc-shaped thin plate member made of a metal material such as stainless steel. For example, the ring member 140 is formed as a ring-shaped member made of a metal material such as stainless steel.

Further, for example, the diaphragm 130 is subjected to girth welding by laser welding, etc. while being interposed between the receiving member 120 and the ring member 140. In this way, the receiving member 120, the diaphragm 130, and the ring member 140 are integrated to form a pressure receiving structure.

The semiconductor type pressure detection device 150 is die-bonded to the central portion of the base 110 using adhesion, etc. The semiconductor type pressure detection device 150 includes a support substrate 152 made of glass and a pressure detection element (semiconductor chip) 154 joined to the support substrate 152. As an example thereof, for example, the pressure detection element 154 includes eight bonding pads (electrodes). Three of the bonding pads correspond to a power input pad for an output signal, an earth pad, and a signal output pad. Further, remaining five bonding pads correspond to signal adjustment pads.

As illustrated in FIG. 1A, an earth terminal pin 160, a power input terminal pin 162, and a signal output terminal pin 164 are attached to the base 110 by penetrating the base 110 using brazing.

The earth terminal pin 160, the power input terminal pin 162, and the signal output terminal pin 164 are electrically connected to the earth pad, the power input pad, and the signal output pad of the semiconductor type pressure detection device 150 described above through a bonding wire 166.

In addition, in the semiconductor type pressure detection device 150 electrically connected to the three terminal pins 160, 162, and 164 attached to the base 110, a temperature correction operation (trimming operation) is performed by allowing a conducting probe to come into contact with the above-described respective eight pads.

As an example of a procedure of assembling the pressure detection unit 100 according to Embodiment 1 of the invention, first, the earth terminal pin 160, the power input terminal pin 162, and the signal output terminal pin 164 are inserted into the through-holes 116 formed in the base 110, and the three terminal pins 160, 162, and 164 and the base 110 are subjected to brazing to form a first brazing portion (see reference symbol B1 of FIG. 1A), thereby joining and fixing the terminal pins 160, 162, and 164 to the base 110 (terminal pin attachment process). In other words, a brazing material such as silver solder is interposed between the through-holes 116 formed in the base 110 and the terminal pins 160, 162, and 164, and heating is performed at a predetermined temperature in this state, thereby forming the first brazing portion B1 between ceramic of the base 110 and metal of the terminal pins 160, 162, and 164.

In this instance, wettability of the ceramic material and the brazing material may be enhanced by forming a metallized layer (for example, a Mo—Mn layer, etc.) in advance on a surface coming into contact with the brazing material of the base 110 before a brazing operation is performed.

Subsequently, the base 110 is joined to an upper surface of the ring member 140 (a surface on an opposite side from a surface on which the diaphragm 130 is welded) using a second brazing portion (see reference numeral B2 of FIG. 1A) (ring member joining process).

In the ring member joining process, for example, a brazing material such as silver solder is interposed between the base 110 and the ring member 140, and heating is performed at a predetermined temperature in this state, thereby forming the second brazing portion B2 between the ceramic material of the base 110 and the metal material of the ring member 140.

In this instance, wettability of the ceramic material and the brazing material may be enhanced by forming a metallized layer (for example, a Mo—Mn layer, etc.) in advance on a surface coming into contact with the brazing material of the base 110 before the brazing operation is performed.

Subsequently, the semiconductor type pressure detection device 150 is die-bonded to the central portion of the base 110.

Thereafter, the earth pad, the power input pad, and the signal output pad of the semiconductor type pressure detection device 150 are electrically connected to the one ends of the three terminal pins 160, 162, and 164, respectively, through the bonding wire 166 (electric connection process).

Subsequently, the conducting probe is allowed to come into contact with the eight respective pads described above in the pressure detection element 154 of the semiconductor type pressure detection device 150 exposed inside the base 110, and the temperature correction operation (trimming operation) for the pressure detection element 154 is performed (temperature correction process).

In more detail, intensity of a signal output from the signal output pad or the adjustment pad is read in a state in which load is applied to the pressure detection element 154 at a reference temperature (for example, room temperature), and a correlation between signal intensity values for respective predetermined loads is obtained to set a correction factor.

Finally, while the diaphragm 130 is interposed between the receiving member 120 and the ring member 140, and a liquid medium is injected into the pressure receiving space S1 formed between the base 110 and the diaphragm 130, an overlapping portion between the receiving member 120 and the ring member 140 is continuously subjected to girth welding in an outer circumferential direction to integrate the receiving member 120 and the ring member 140 as described above (integration process).

In this instance, fusion welding such as laser welding or arc welding, or resistance welding such as seam welding may be applied to a girth welding scheme. However, it is preferable to apply laser welding, electron beam welding, etc. having a small heat input in consideration of a reduction in distortion due to welding.

Figure 2:
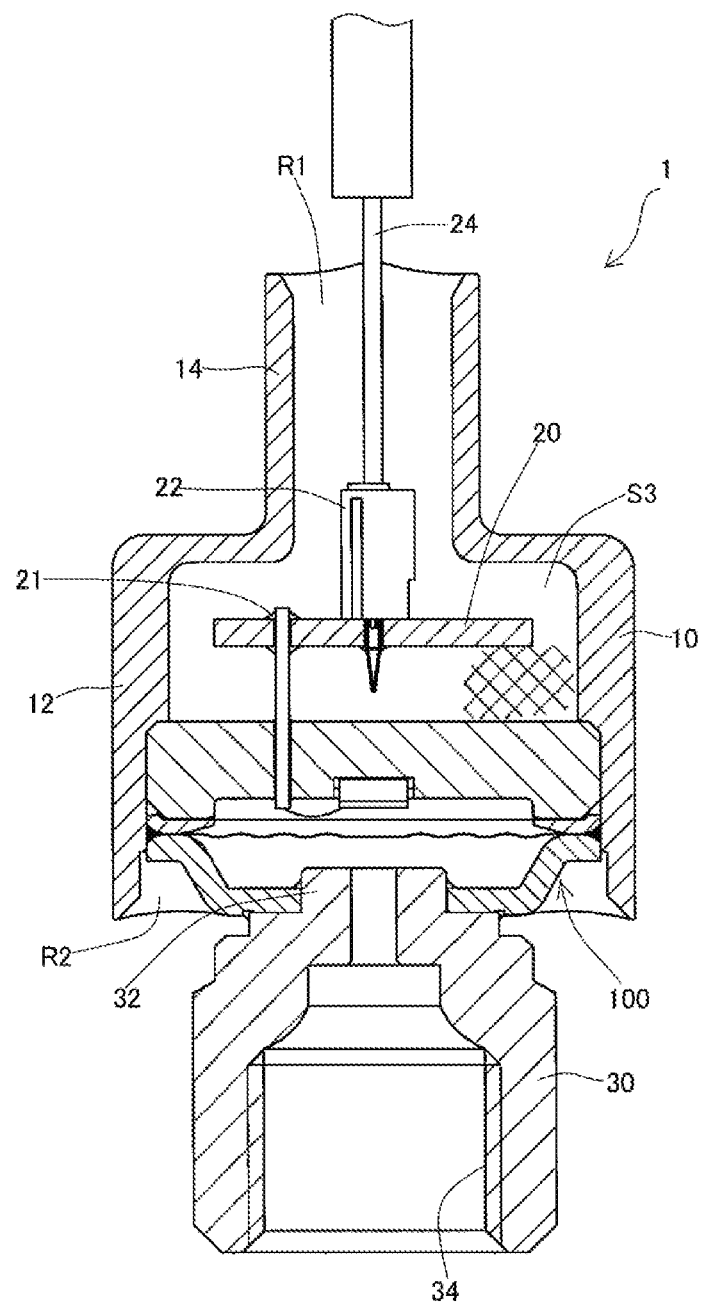
FIG. 2 is a longitudinal sectional view of a pressure sensor in which a pressure detection unit according to Embodiment 1 of the invention is installed.

FIG. 2 is a longitudinal sectional view of a pressure sensor in which the pressure detection unit according to Embodiment 1 of the invention illustrated in FIGS. 1A and 1B is installed.

As illustrated in FIG. 2, a pressure sensor 1 includes the pressure detection unit 100 according to Embodiment 1 of the invention illustrated in FIGS. 1A and 1B, a cylindrical cover 10 attached to the pressure detection unit 100, a relay board 20 to which the one ends of the three terminal pins 160, 162, and 164 protruding from the pressure detection unit 100 are attached, a connector 22 attached to the relay board 20, a lead wire 24 connected to the connector 22 to exchange an electrical signal, etc. with external equipment, and a fluid inlet pipe 30 attached to the receiving member 120 of the pressure detection unit 100.

The cover 10 is a member having a stepped cylindrical shape including a large diameter portion 12 and a small diameter portion 14, and is attached to the pressure detection unit 100 from the base 110 side in a mode in which the large diameter portion 12 encloses an outer circumferential portion of the pressure detection unit 100.

As illustrated in FIG. 2, an inner space S3, which uses the base 110 as a bottom surface, is formed inside the cover 10, and the relay board 20 and the connector 22 described below are accommodated in the inner space S3.

The inner space S3 formed inside the cover 10 is filled with a resin R1, and the resin R1 is solidified. Further, an opening end side of the large diameter portion 12 is filled with a resin R2 in a mode in which the pressure detection unit 100 is covered with the resin R2, and the resin R2 is solidified.

These resins R1 and R2 prevent water, etc. from penetrating into the cover 10 to protect an electric system of the relay board 20, etc.

The relay board 20 is formed as a baking board, a glass epoxy board, a ceramic board, or a flexible board, one end of the connector 22 is attached to a central portion of the relay board 20, and a via electrode and a metal wiring layer (not illustrated) are included around a position at which the connector 22 is attached to the central portion.

The one end of the connector 22 is attached to the relay board 20, and the lead wire 24 extending to an outside of the cover 10 is attached to the other end of the connector 22.

In addition, each of the one ends of the three terminal pins 160, 162, and 164 protruding from the base 110 of the pressure detection unit 100 penetrates a via electrode of the relay board 20 and is anchored to the via electrode.

In this instance, the three terminal pins 160, 162, and 164 are electrically anchored and connected to the via electrode using, for example, soldering.

For example, the fluid inlet pipe 30 is a pipe-shaped member made of a metal material such as a copper alloy, an aluminum alloy, etc. and includes an attachment portion 32 attached to the receiving member 120 of the pressure detection unit 100 and a connection portion 34 connected to a pipe through which a fluid subjected to pressure detection flows.

The attachment portion 32 is attached to the opening 123 of the receiving member 120 illustrated in FIGS. 1A and 1B using an arbitrary scheme such as welding, adhesion, mechanical fastening, etc.

When the pressure sensor 1 illustrated in FIG. 2 is assembled, first, the relay board 20, to which the connector 22 is attached, is anchored to the one ends of the three terminal pins 160, 162, and 164 protruding from the base 110 of the pressure detection unit 100.

Meanwhile, the attachment portion 32 of the fluid inlet pipe 30 is attached and fixed to the opening 123 of the receiving member 120 of the pressure detection unit 100.

Subsequently, the pressure detection unit 100 is inserted into the large diameter portion 12 of the cover 10 such that the lead wire 24 is exposed to the outside through the small diameter portion 14 by being inserted from the large diameter portion 12.

Thereafter, the resin R1 is injected from the opening of the cover 10 on the small diameter portion 14 side, and the resin R1 is solidified, thereby sealing the inner space S3.

Similarly, the resin R2 is injected from an opening end on the large diameter portion 12 side, and the resin R2 is solidified, thereby fixing the pressure detection unit 100 inside the cover 10.

In the pressure sensor 1 illustrated in FIG. 2, the fluid subjected to pressure detection and introduced to the fluid inlet pipe 30 enters the pressurization space S2 of the pressure detection unit 100, and deforms the diaphragm 130 at a pressure thereof.

When the diaphragm 130 is deformed, the liquid medium inside the pressure receiving space S1 is pressurized, and the pressure at which the diaphragm 130 is deformed is delivered to the pressure detection element 154 of the semiconductor type pressure detection device 150.

The pressure detection element 154 detects a change in the delivered pressure, converts the change into an electrical signal, and outputs the electrical signal to the relay board 20 through the signal output terminal pin 164.

Then, the electrical signal is delivered to a wiring layer of the relay board 20, and outputs to external equipment through the connector 22 and the lead wire 24.

When these configurations are included, the base 110 to which the semiconductor type pressure detection device 150 is attached is formed using the ceramic material whose thermal expansion coefficient is small in the pressure detection unit 100 according to the embodiment of the invention and the pressure sensor 1 to which the pressure detection unit 100 is applied, and thus it is possible to inhibit the base 110 from expanding or contracting at the time of assembling and manufacturing the pressure detection unit 100 or due to a change in thermal environment in which the pressure sensor 1 is used.

Therefore, even when the trimming operation is performed in a stage in which the semiconductor type pressure detection device 150 is attached to the base 110, since expansion or contraction of the base 110 in a heat input of brazing, etc. in the assembly operation thereafter may be ignored, the trimming operation may be performed during the assembly operation before a base joining process using a simple structure.

Further, when the base 110 is formed using the ceramic material whose thermal expansion coefficient is small, and the number of terminal pins 160, 162, and 164 is set to three, a transfer path of common mode noise transferred from a pipe, etc. may be minimized. Thus, it is possible to reduce a decrease in detection accuracy resulting from detection of noise by the semiconductor type pressure detection device 150.

In addition, when the base 110 is formed using the ceramic material whose thermal expansion coefficient is small, a change in shape or dimensions of the base 110 is small even in a case in which the base 110 is exposed to a touch usage environment of a high temperature or a low temperature when compared to a conventional base made of a metal material. Thus, it is possible to suppress a decrease in detection accuracy due to a thermal environment of the semiconductor type pressure detection device 150.

In addition, when the base 110 is formed using the ceramic material, a hermetic seal made of glass, which is used when a terminal pin is buried in a base in a pressure detection unit having a conventional type, may be replaced by a brazing portion. Thus, it is possible to prevent a fragile hermetic seal portion from being damaged to prevent the liquid medium that fills the pressure receiving space from leaking.

Further, the pressure detection unit 100 according to the embodiment of the invention and the pressure sensor 1 to which the pressure detection unit 100 is applied form the pressure receiving structure in which the receiving member 120, the diaphragm 130, and the ring member 140 are integrated by interposing the diaphragm 130 between the receiving member 120 and the ring member 140 in advance, and have a structure in which the base 110 is joined to the ring member 140 of the pressure receiving structure. Thus, the diaphragm 130, which is a thin plate and relatively weak, may be reinforced by the receiving member 120 and the ring member 140.

In addition, when the base 110 is joined to the pressure receiving structure, only positioning between the base 110 and the ring member 140 may be performed. Thus, it is possible to simplify a joining operation, and to improve shape accuracy of the pressure detection unit 100.

Embodiment 2

Figure 3A:
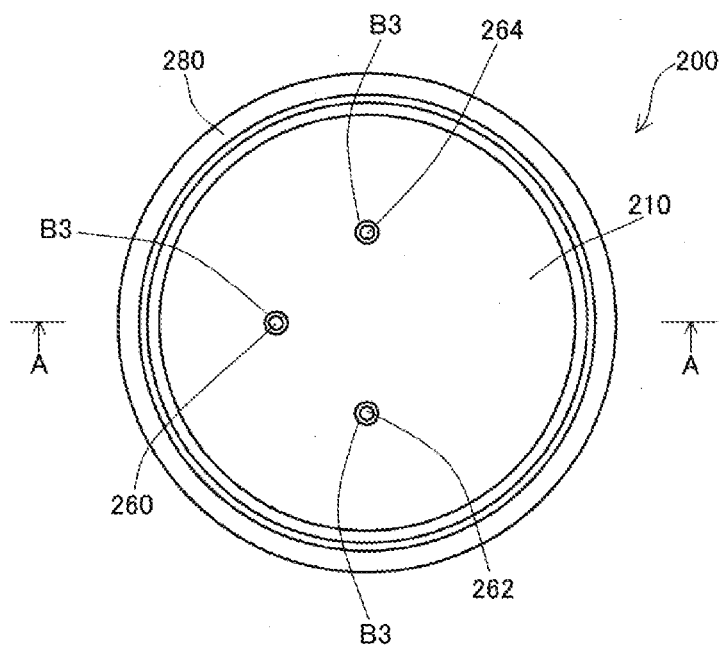
Figure 3B:
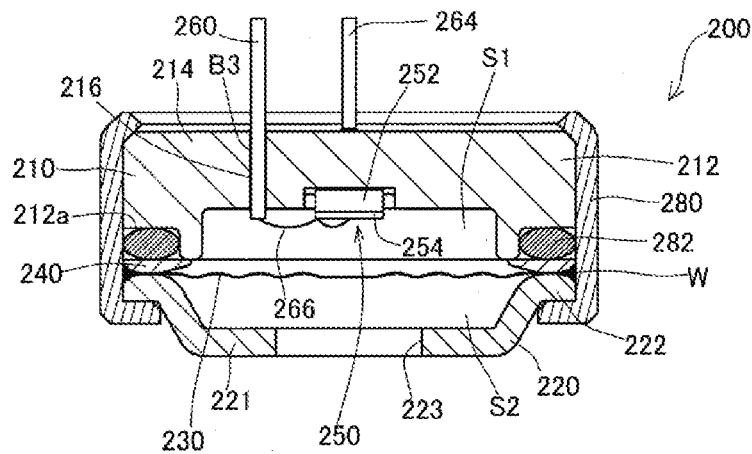

FIGS. 3A and 3B illustrate an outline of a pressure detection unit according to Embodiment 2 of the invention. FIG. 3A illustrates a top view of the pressure detection unit, and FIG. 3B illustrates a cross section taken along A-A line of FIG. 3A in side view.

As illustrated in FIGS. 3A and 3B, the pressure detection unit 200 according to Embodiment 2 of the invention includes a base 210 made of ceramic, a receiving member 220 facing the base 210, a diaphragm 230 and a ring member 240 interposed between the base 210 and the receiving member 220, and a caulking member 280 that integrally fixes the base 210 and the receiving member 220 from an outer circumferential side.

Similarly to Embodiment 1, the base 210 is a circular lid-shaped member in top view, and includes a ceramic material having an insulating property in which an outer circumferential portion 212 and an inner portion 214 having a smaller thickness than that of the outer circumferential portion 212 are integrated with each other as illustrated in FIG. 3B. That is, the base 210 has a shape in which a central portion thereof is recessed such that a pressure receiving space S1 described below is formed.

In addition, a ring-shaped notch portion 212a, which is open in an outer circumferential direction, is formed at a lower end of the outer circumferential portion 212, and a sealing member 282 such as an O-ring described below is attached to the notch portion 212a.

The pressure receiving space S1 is formed between the inner portion 214 of the base 210 and the diaphragm 230, and filled with a liquid medium having an insulating property such as oil.

In addition, a semiconductor type pressure detection device 250 described below is installed at a central portion on the pressure receiving space S1 side in the inner portion 214 of the base 210.

As illustrated in FIG. 3A, a plurality of through-holes (see reference numeral 216 of FIG. 3B) into which the three terminal pins 260, 262, and 264 are inserted is formed at positions around the semiconductor type pressure detection device 250 in the base 210.

Further, the three terminal pins 260, 262, and 264 penetrate the base 210 by being inserted into the plurality of through-holes 216, and one ends thereof are electrically connected to the semiconductor type pressure detection device 250.

Similarly to Embodiment 1, for example, the receiving member 220 is formed using a metal material such as a stainless steel plate, is a plate-shaped member subjected to press molding such that a central portion is recessed, and includes a cylindrical portion 221 having a bottom and a cylindrical shape and a flange portion 222 formed at an upper end of the cylindrical portion 221 (the receiving member 220 may be formed by cutting, etc. other than press molding).

An opening 223 for installing a fluid inlet pipe is formed on a bottom surface of the cylindrical portion 221, and the diaphragm 230 is joined to an upper surface of the flange portion 222.

According to this configuration, a pressurization space S2 into which a fluid to be detected flows is formed between the receiving member 220 and the diaphragm 230.

Similarly to Embodiment 1, the diaphragm 230 is formed as a disc-shaped thin plate member made of a metal material, and the ring member 240 is formed as a ring-shaped member made of a metal material.

Further, the diaphragm 230 is subjected to girth welding while being interposed between the receiving member 220 and the ring member 240. In this way, the receiving member 220, the diaphragm 230, and the ring member 240 are integrated to form a pressure receiving structure.

Similarly to Embodiment 1, the semiconductor type pressure detection device 250 includes a support substrate 252 made of glass and a pressure detection element (semiconductor chip) 254 joined to the support substrate 252, and is die-bonded to the central portion of the base 210 using adhesion, etc.

The pressure detection element 254 includes a power input pad for an output signal, an earth pad, a signal output pad, and a signal adjustment pad similar to those of Embodiment 1.

As illustrated in FIG. 3A, an earth terminal pin 260, a power input terminal pin 262, and a signal output terminal pin 264 are attached to the base 210 by penetrating the base 210 using brazing.

The earth terminal pin 260, the power input terminal pin 262, and the signal output terminal pin 264 are electrically connected to the earth pad, the power input pad, and the signal output pad of the semiconductor type pressure detection device 250 described above through a bonding wire 266.

In addition, in the semiconductor type pressure detection device 250 electrically connected to the three terminal pins 260, 262, and 264 attached to the base 210, a temperature correction operation (trimming operation) is performed by allowing a conducting probe to come into contact with the respective pads of the pressure detection element 254 described above.

For example, the caulking member 280 is a ring-shaped member made of a metal material and disposed to surround outer circumferences of the base 210 and the receiving member 220 while the base 210 and the receiving member 220 are overlapped each other, and an upper end portion and a lower end portion thereof are integrated and fixed to each other by being subjected to plastic deformation to an inner circumferential side using a caulking device (not illustrated).

When such a configuration is employed, a degree of adhesion between the base 210 and the receiving member 220 (or the ring member 240) is improved, and a structure of surrounding an outer circumferential side of an overlapping portion thereof is obtained. Thus, higher air tightness or liquid tightness may be ensured.

As an example of a procedure of assembling the pressure detection unit 200 according to Embodiment 2 of the invention, first, the earth terminal pin 260, the power input terminal pin 262, and the signal output terminal pin 264 are inserted into the through-holes 216 formed in the base 210, and the three terminal pins 260, 262, and 264 and the base 210 are subjected to brazing to form a brazing portion (see reference symbol B3 of FIG. 3A), thereby joining and fixing the terminal pins 260, 262, and 264 to the base 210 (terminal pin attachment process).

In other words, similarly to Embodiment 1, a brazing material such as silver solder is interposed between the through-holes 216 formed in the base 210 and the terminal pins 260, 262, and 264, and heating is performed at a predetermined temperature in this state, thereby forming a brazing portion B3 between ceramic of the base 210 and metal of the terminal pins 260, 262, and 264.

In this instance, a metallized layer (for example, a Mo—Mn layer, etc.) may be formed in advance on a surface coming into contact with the brazing material of the base 210 before a brazing operation is performed.

Subsequently, the semiconductor type pressure detection device 250 is die-bonded to the central portion of the base 210.

Thereafter, the earth pad, the power input pad, and the signal output pad of the semiconductor type pressure detection device 250 are electrically connected to the one ends of the three terminal pins 260, 262, and 264, respectively, through the bonding wire 266 (electric connection process).

Subsequently, the conducting probe is allowed to come into contact with the eight respective pads described above in the pressure detection element 254 of the semiconductor type pressure detection device 250 exposed inside the base 210, and the temperature correction operation (trimming operation) for the pressure detection element 254 is performed (temperature correction process).

In more detail, intensity of a signal output from the signal output pad or the adjustment pad is read in a state in which load is applied to the pressure detection element 254 at a reference temperature (for example, room temperature), and a correlation between signal intensity values for respective predetermined loads is obtained to set a correction factor.

Subsequently, while the diaphragm 230 is interposed between the receiving member 220 and the ring member 240, and the pressure receiving space S1 formed between the base 210 and the diaphragm 230 is filled with a liquid medium, an overlapping portion of the receiving member 220 and the ring member 240 is continuously subjected to girth welding from an outer circumferential direction as described above (girth welding process).

In this instance, girth welding such as laser welding or arc welding, or resistance welding such as seam welding may be applied to a girth welding scheme. However, it is preferable to apply laser welding, electron beam welding, etc. having a small heat input in consideration of a reduction in distortion due to welding.

Finally, the base 210 is overlapped with an upper surface of the ring member 240 girth-welded to the receiving member 220 while the sealing member 282 such as an O-ring is attached to the notch portion 212a formed at the lower end of the outer circumferential portion 212 of the base 210, and the base 210 is caulked and fixed by the caulking member 280 and integrated with the upper surface (integration process).

In this instance, a height and a width of the sealing member 282 are selected such that the height and the width are slightly larger dimensions than a height and a width of the notch portion 212a formed in the base 210. In this way, compression is performed in a vertical direction and a left-right direction inside the notch portion 212a at the time of caulking and fixing, and thus reliable air tightness and water tightness may be ensured.

Figure 4:
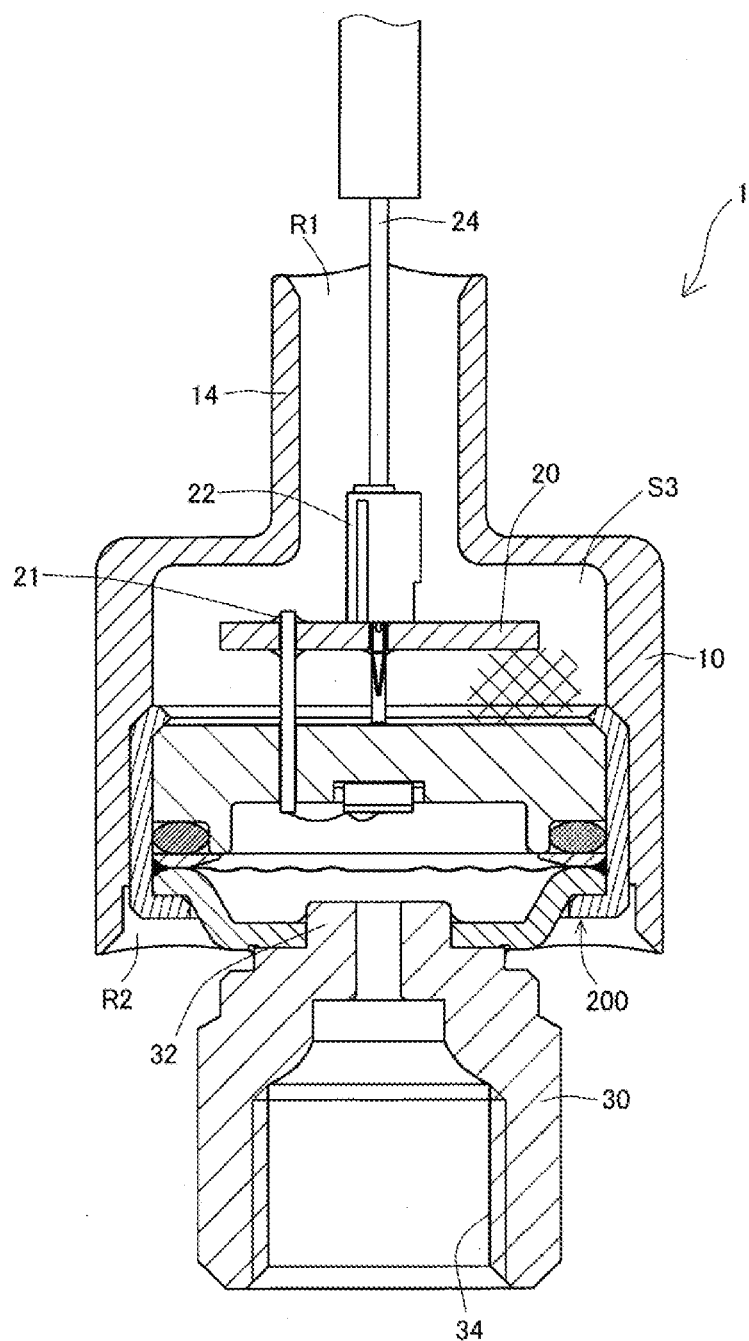
FIG. 4 is a longitudinal sectional view of a pressure sensor in which the pressure detection unit according to Embodiment 2 of the invention is installed.

FIG. 4 is a longitudinal sectional view of a pressure sensor in which the pressure detection unit according to Embodiment 2 of the invention illustrated in FIG. 3 is installed.

As illustrated in FIG. 4, the pressure sensor 1 includes the pressure detection unit 200 according to Embodiment 2 of the invention illustrated in FIGS. 3A and 3B, a cylindrical cover 10 attached to the pressure detection unit 200, a relay board 20 to which the one ends of the three terminal pins 260, 262, and 264 protruding from the pressure detection unit 200 are attached, a connector 22 attached to the relay board 20, a lead wire 24 connected to the connector 22 to exchange an electrical signal, etc. with external equipment, and a fluid inlet pipe 30 attached to the receiving member 220 of the pressure detection unit 200.

Similarly to Embodiment 1, the cover 10 is a member having a stepped cylindrical shape including a large diameter portion 12 and a small diameter portion 14, and is attached to the pressure detection unit 200 from the base 210 side in a mode in which the large diameter portion 12 encloses the caulking member 280 of the pressure detection unit 200.

As illustrated in FIG. 4, an inner space S3, which uses the base 210 as a bottom surface, is formed inside the cover 10, and the relay board 20 and the connector 22 described below are accommodated in the inner space S3.

The inner space S3 formed inside the cover 10 is filled with a resin R1, and the resin R1 is solidified. Further, an opening end side of the large diameter portion 12 is filled with a resin R2 in a mode in which the pressure detection unit 200 is covered with the resin R2, and the resin R2 is solidified.

These resins R1 and R2 prevent water, etc. from penetrating into the cover 10 to protect an electric system of the relay board 20, etc.

Similarly to Embodiment 1, the relay board 20 is formed as a baking board, a glass epoxy board, a ceramic board, or a flexible board, and one end of the connector 22 is attached to a central portion of the relay board 20. One end of the connector 22 is attached to the relay board 20, and the lead wire 24 extending to an outside of the cover 10 is attached to the other end of the connector 22.

In addition, each of the one ends of the three terminal pins 260, 262, and 264 protruding from the base 210 of the pressure detection unit 200 penetrates a via electrode of the relay board 20 and is anchored to the via electrode.

Similarly to Embodiment 1, the fluid inlet pipe 30 is a pipe-shaped member made of a metal material and includes an attachment portion 32 attached to the receiving member 220 of the pressure detection unit 200 and a connection portion 34 connected to a pipe through which a fluid subjected to pressure detection flows.

The attachment portion 32 is attached to the opening 223 of the receiving member 220 illustrated in FIG. 3B using an arbitrary scheme such as welding, adhesion, mechanical fastening, etc.

When the pressure sensor 1 illustrated in FIG. 4 is assembled, first, the relay board 20, to which the connector 22 is attached, is anchored to the one ends of the three terminal pins 260, 262, and 264 protruding from the base 210 of the pressure detection unit 200. Meanwhile, the attachment portion 32 of the fluid inlet pipe 30 is attached and fixed to the opening 223 of the receiving member 220 of the pressure detection unit 200.

Subsequently, the pressure detection unit 200 is inserted into the large diameter portion 12 of the cover 10 such that the lead wire 24 is exposed to the outside through the small diameter portion 14 by being inserted from the large diameter portion 12. Thereafter, the resin R1 is injected from the opening of the cover 10 on the small diameter portion 14 side, and the resin R1 is solidified, thereby sealing the inner space S3.

Similarly, the resin R2 is injected from an opening end on the large diameter portion 12 side, and the resin R2 is solidified, thereby fixing the pressure detection unit 200 inside the cover 10.

When these configurations are included, in addition to an effect described in Embodiment 1, the pressure detection unit 200 according to Embodiment 2 of the invention and the pressure sensor 1 to which the pressure detection unit 200 is applied may ensure more reliable air tightness and water tightness of the pressure detection unit 200 since the overlapping portion of the base 210 and the receiving member 220 (or the ring member 240) is not exposed by caulking, fixing, and integrating the base 210 and the receiving member 220 from the outer circumferential side using the caulking member 280.

In addition, the base 210 and the ring member 240 may not be brazed, that is, the diaphragm 230 may be interposed between the receiving member 220 and the ring member 240 and subjected to girth welding separately from the base 210, and thus it is possible to miniaturize equipment for girth welding, and to improve dimensional accuracy.

The invention is not restricted to the above respective embodiments, and various alterations may be made.

For example, Embodiment 1 describes a case in which the second brazing portion B2 is formed after the first brazing portion B1 is formed. However, the first brazing portion B1 and the second brazing portion B2 may be formed in the same process when brazing materials for forming these brazing portions have the same or substantially the same melting temperatures.

In this way, time required to manufacture the pressure sensor may be drastically reduced.

In addition, Embodiment 1 and Embodiment 2 describe that the diaphragm 130 (230) and the ring member 140 (240) are interposed between the base 110 (210) and the receiving member 120 (220). However, it is possible to employ a structure in which the diaphragm 130 (230) is directly interposed between the base 110 (210) and the receiving member 120 (220) without the ring member 140 (240) interposed therebetween by selecting an appropriate joining technology between the base 110 (210) made of the ceramic material and the diaphragm 130 (230) made of the metal material.

In this way, it is possible to reduce manufacturing cost and material of the ring member 140 (240), and to attempt a weight reduction of the whole pressure detection unit 100 (200).

In addition, Embodiment 1 and Embodiment 2 described a case in which the base 110 (210) and the ring member 140 (240) are subjected to brazing while the pressure receiving space S1 formed between the base 110 (210) and the diaphragm 130 (230) is filled with the liquid medium. However, after the base 110 (210) and the ring member 140 (240) are subjected to brazing, the liquid medium may be injected from an inflow hole formed in the base 110 (210), and then an inlet of the inflow hole may be sealed by welding a ball thereto.

In this instance, for example, a metallized layer may be formed around the inflow hole on an outer surface of the base 110 (210), and the metallized layer and the ball may be subjected to resistance welding and attached to each other.

Further, Embodiment 2 describes a case in which a pressure detector is integrally fixed using the caulking member. However, it is possible to form a caulking portion that caulks and fixes the pressure detection unit 200 and the cover 10 to an outer circumferential portion of the fluid inlet pipe 30 that introduces the fluid subjected to pressure detection to the pressurization space S2 of the receiving member 220 in place of a configuration of the caulking member, and to collectively integrally fix outer circumferences of the pressure detection unit 200 and the cover 10 from outer circumferential sides.

When such a configuration is employed, it is possible to reduce a process of injecting and solidifying the resin R2, and to fully accommodate the pressure detection unit 200 inside the cover 10 and the fluid inlet pipe 30. Thus, water tightness may be further improved.

EXPLANATIONS OF LETTERS OR NUMERALS

1 . . . pressure sensor
10 . . . cover
20 . . . relay board
22 . . . connector
24 . . . lead wire
30 . . . fluid inlet pipe
100, 200 . . . pressure detection unit
110, 210 . . . base
112, 212 . . . outer circumferential portion
114, 214 . . . inner portion
120, 220 . . . receiving member
121, 221 . . . cylindrical portion
122, 222 . . . flange portion
123, 223 . . . opening
130, 230 . . . diaphragm
140, 240 . . . ring member
150, 250 . . . semiconductor type pressure detection device
152, 252 . . . support substrate
154, 254 . . . pressure detection element
160, 260 . . . earth terminal pin
162, 262 . . . power input terminal pin
164, 264 . . . signal output terminal pin
166, 266 . . . bonding wire
280 . . . caulking member
282 . . . sealing member

The invention claimed is:

1. A pressure detection unit comprising:
a base formed in a lid shape and made of ceramic;
a receiving member formed in a plate shape;
a diaphragm interposed between said base and said receiving member;
a semiconductor type pressure detection device installed on a side of a pressure receiving space formed between said base and said diaphragm in said base; and
three terminal pins electrically connected to said semiconductor type pressure detection device, said terminal pins penetrating said base,
wherein said three terminal pins include an earth terminal pin, a power input terminal pin, and a signal output terminal pin,
wherein a first brazing portion is formed between said base and said three terminal pins,
wherein a ring member is further interposed between said base and said diaphragm,
wherein a second brazing portion is formed between said base and said ring member,
wherein the diaphragm is interposed between the receiving member and the ring member, and the diaphragm, the receiving member, and the ring member are integrated by welding, and
wherein the pressure receiving space is sealed and filled with a liquid medium.

2. The pressure detection unit according to claim 1, wherein a metallized layer is further formed between said base and said first brazing portion.

3. The pressure detection unit according to claim 1, further comprising
a caulking member that caulks and integrates said base and said receiving member from outer circumferential sides.

4. The pressure detection unit according to claim 1, wherein a metallized layer is further formed between said base and said second brazing portion.

5. A pressure sensor comprising:
the pressure detection unit according to claim 1;
a cover attached to wrap said pressure detection unit from an outer circumferential side;
a lead wire having one end electrically connected to a terminal pin of said pressure detection unit and the other end protruding to an outside of said cover; and
a fluid inlet pipe attached to a receiving member of said pressure detection unit.

6. A method of manufacturing a pressure detection unit comprising:
a terminal pin attachment process of attaching three terminal pins to a base formed in a lid shape and made of ceramic, said three terminal pins penetrating said base, wherein said three terminal pins are joined to said base through a first brazing process in said terminal pin attachment process to form a first brazing portion;
an electric connection process of installing a semiconductor type pressure detection device at a central portion of said base, and electrically connecting said three respective terminal pins to said semiconductor type pressure detection device; and an integration process of integrating a diaphragm with said base and a receiving member formed in a plate shape while the diaphragm is interposed between said base and said receiving member, wherein a ring member is further interposed between said base and said diaphragm, wherein a second brazing portion is formed between said base and said ring member, wherein the diaphragm is interposed between the receiving member and the ring member, and the diaphragm, the receiving member, and the ring member are integrated by welding in said integration process, and wherein the pressure receiving space is sealed and filled with a liquid medium.

7. The method of manufacturing a pressure detection unit according to claim 6, wherein the ring member is simultaneously attached to said base by said brazing process in said terminal pin attachment process.

8. The method of manufacturing a pressure detection unit according to claim 6, wherein a metallization process is performed before said brazing process in said terminal pin attachment process.

9. The method of manufacturing a pressure detection unit according to claim 6, wherein the welding correspond to laser welding or electron beam welding.

10. The method of manufacturing a pressure detection unit according to claim 6, wherein said base and said receiving member integrated by caulking processing using a caulking member from outer circumferential sides in said integration process.

11. The method of manufacturing a pressure detection unit according to claim 6, further comprising a temperature correction process of performing a temperature correction operation on said semiconductor type pressure detection device between said electric connection process and said integration process.

\* \* \* \* \*